Dec. 6, 1955

R. WISE 2,725,999

SCOOPS FOR FORK-LIFT TRUCKS

Filed Sept. 3, 1954

INVENTOR:
RONALD WISE

BY *Milo B. Stevens & Co.*

ATTYS

Dec. 6, 1955 R. WISE 2,725,999
SCOOPS FOR FORK-LIFT TRUCKS
Filed Sept. 3, 1954 2 Sheets-Sheet 2

INVENTOR:
RONALD WISE

BY Milo B. Stevens & Co.
ATTYS

United States Patent Office 2,725,999
Patented Dec. 6, 1955

2,725,999

SCOOPS FOR FORK-LIFT TRUCKS

Ronald Wise, Chicago, Ill.

Application September 3, 1954, Serial No. 454,139

2 Claims. (Cl. 214—620)

My invention relates to fork trucks and loading vehicles, and more particularly to the scoops applicable to the same and employed for picking up sand, cement and other construction materials. Vehicles of the type considered are equipped with a pair of arms commonly called forks and intended for lifting loads located in front of the vehicle. In order to adapt the improved scoop to a vehicle equipped as stated, it is one object to construct the scoop with means suitable for receiving the forks previously referred to, whereby to cause the scoop to become supported on the forks.

A further object is to equip the scoop with a pair of receptacles designed to receive the forks when the vehicle is advanced on the scoop, so that the latter may be picked up and supported by the forks.

Another object is to form the scoop with a bottom which is normally locked in place to support the load picked up by the scoop, but has control means for releasing the bottom when the load is to be dumped.

An additional object is to provide a mechanism for the scoop which may be actuated to swing the bottom to the dumping position in case its load is so light that mere release will not cause the bottom to open.

A still further object is to provide the scoop with a simple control which is accessible to the driver of the vehicle, in order that he may control the scoop without leaving the vehicle.

An important object is to construct the mechanism of the scoop along lines of sturdiness and simplicity.

With the above objects in view, a better understanding of the invention may be had by reference to the accompanying drawings, in which—

Figure 1:
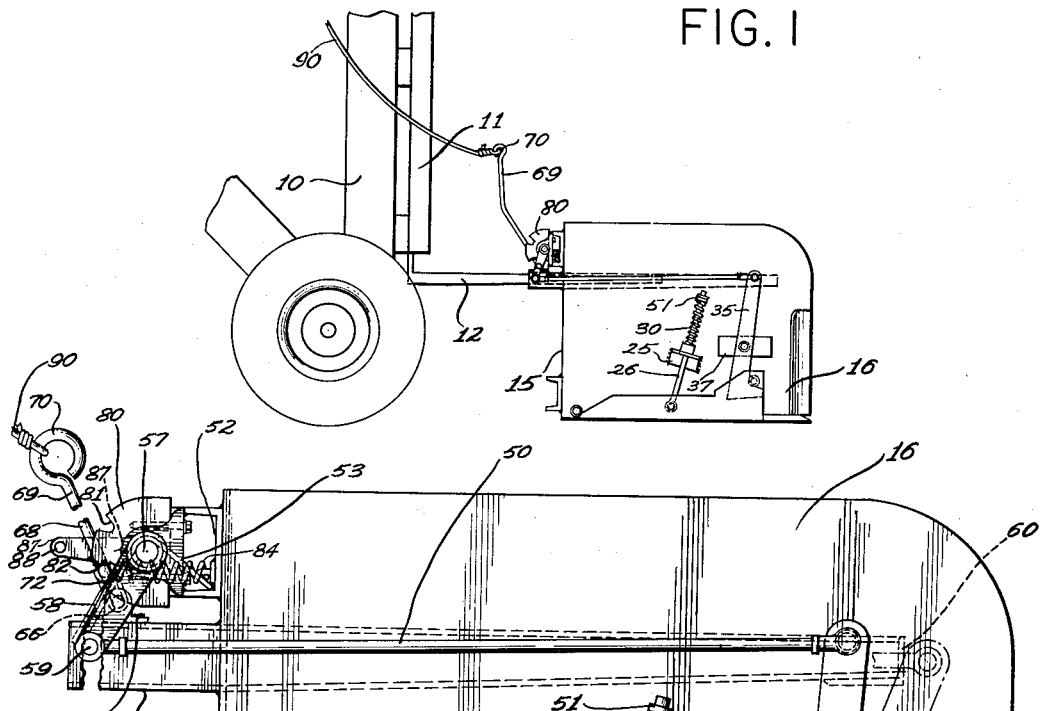
Fig. 1 is a side view of the frontal portion of the truck or other loading vehicle, showing the improved scoop carried by the same.

In accordance with the foregoing, specific reference to the drawings indicates the frontal frame of the vehicle at 10 and its lifting unit at 11. The forks previously referred to are indicated at 12 and project forwardly with a slight taper.

The scoop 15 is of sturdy steel plate construction and has side walls 16. The scoop is open at the top and front, but its bottom 20 is hinged at the rear, as indicated at 21. Primarily, the bottom has a tendency to drop to the dotted line position of Fig. 2, in which position the load carried by it would be dumped; and the scoop is closed by first lowering it until the bottom meets the ground and further lowering it until it closes on the bottom.

Checking devices are carried by the side walls 16 on the outside to prevent the bottom 20 from dropping too far. Thus, each of these devices comprises an angle plate 25 through which a rod 26 is slidable. The lower part of the rod is connected pivotally to an upward flange 28 rising from the corresponding side of the bottom 20, while the upper portion of the rod carries a compression spring 30. The latter is lodged between an upper stop 31 and a rubber block 32, the latter resting on the plate 25. Thus, when the bottom 20 falls, it is limited by the pressure of the spring on the block 32, the latter cushioning the shock of the fall.

Figure 2:
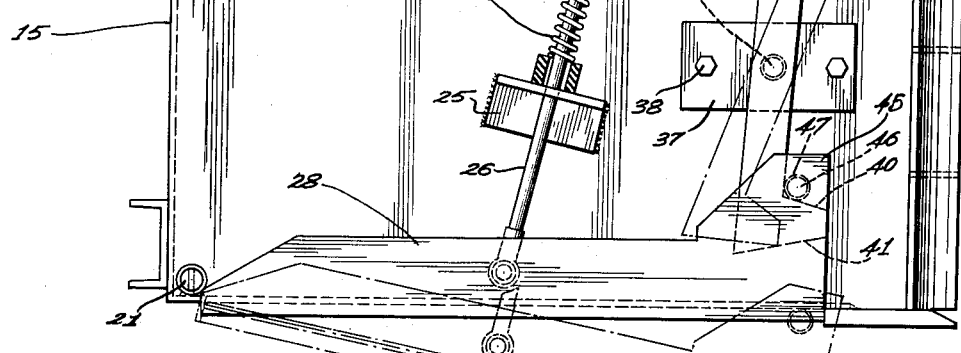
Fig. 2 is a magnified side view of the scoop.
Figure 5:
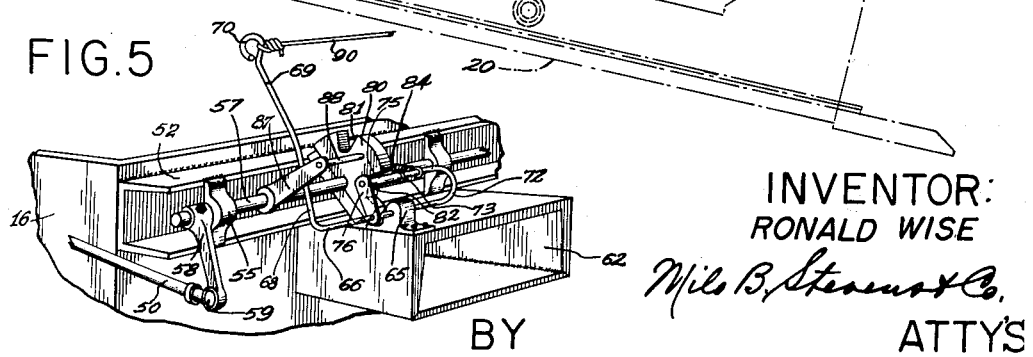
Fig. 5 is a perspective view showing the mechanism involved in the scoop control.
Figure 3:
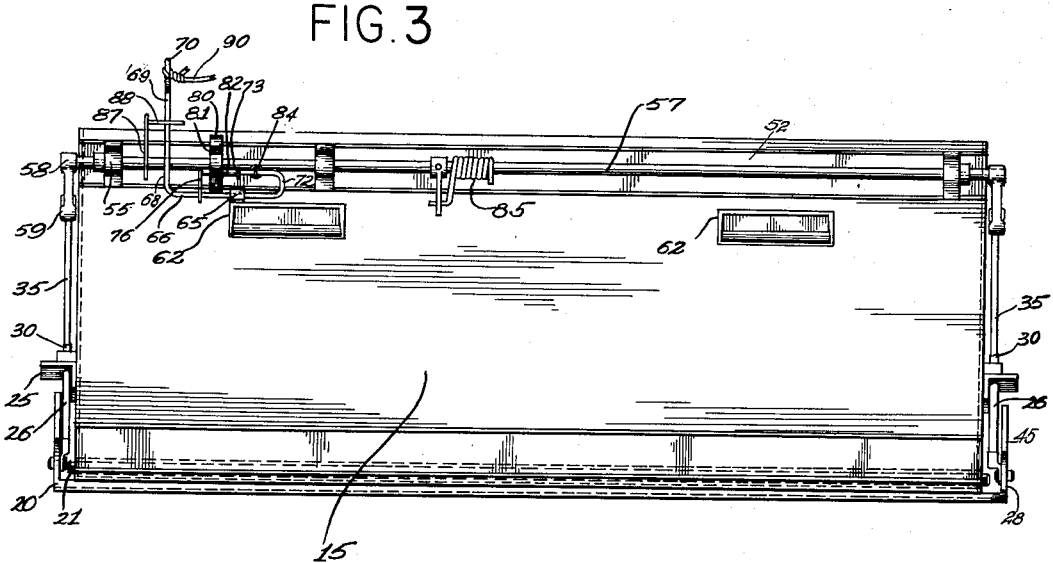
Fig. 3 is a rear view of the scoop as seen from the left-hand side of Fig. 2.
Figure 4:
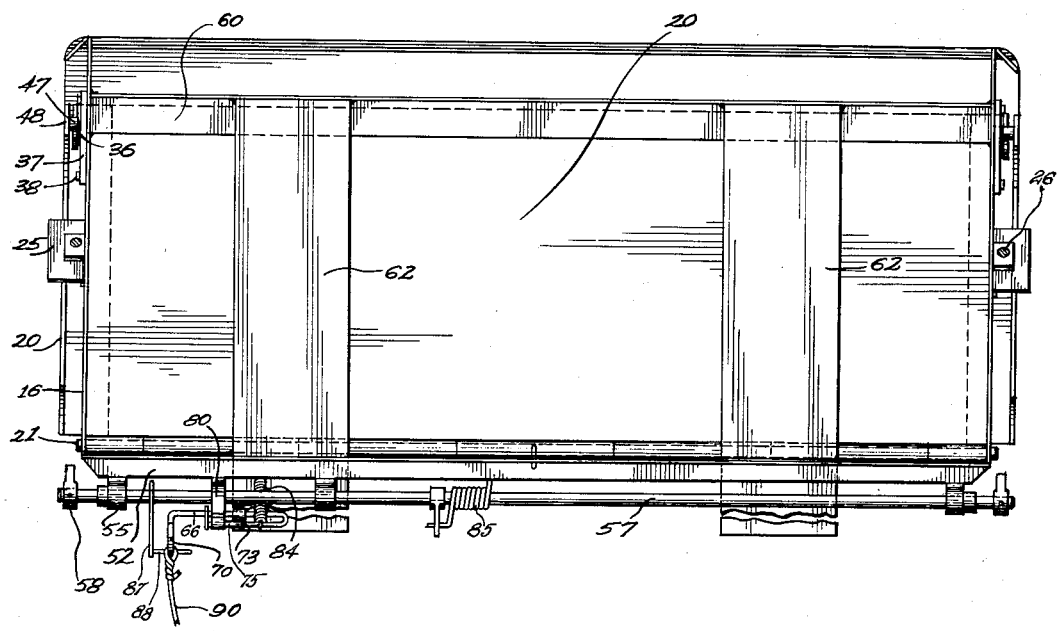
Fig. 4 is a top plan view of the showing in Fig. 3.

The scoop walls 16 carry identical latch devices for the bottom 20 on the outer side. Thus, each device is in the form of a vertically positioned latch bar 35 which is hinged to a stud 36 projecting outwardly from a supporting plate 37, the latter being secured by bolts 38 to the side walls 16. It is seen that the lower end of the latch bar 35 has a hook 40 on the upper side and a cam 41 on the lower side. The flange 28 of the bottom 20 is extended with a wing 45 which carries an inwardly projecting stud 46, the latter preferably journaling a roller 47. When the bottom 20 is closed, Fig. 2 shows that the latch bar 35 supports the bottom by receiving the stud 46 inside the hook 40. Therefore, as long as the latch bar is in the vertical position, the bottom 20 is closed, and the scoop may be advanced on a pile of material to pick up a load. Means are provided to lock the latch bar in the vertical position, as will be explained in a later section. When the load is to be dumped, such means are released. Now, the weight of the load will cause the stud 46 to bear on the hook 40 with a backing effect on the lower part of the latch bar 35, so that the load will be dumped. However, if the load is a light one and does not exert enough influence on the hook 40, means are provided—as will also be explained—to swing the latch bar 35 to the dotted line position indicated in Fig. 2, occasioning the release of the bottom stud 46 and the dumping of the load. After this is done, the lowering of the scoop will close it as was explained previously, during which action the stud 46 will bear on the cam 41 of the latch bar and crowd the same back until the stud trips the hook 40 and again becomes lodged in the same.

The mechanism for controlling the latch bars 35 is mostly at the rear of the scoop, and connects with the upper ends of the latch bars 35 by means of a pair of links 50 extending in approximately horizontal position along the outside of the walls 16. The support for the mechanism is in the form of a sturdy channel bar 52 welded to the back wall of the scoop 15; and vertical plates 53 are welded to the edges of the channel bar wings near the ends for supporting a set of bearings 55 which are alined horizontally to journal a shaft 57. The latter receives cranks 58 at the ends which connect pivotally at 59 with the rear ends of the links 50 in order to operate these in forward and rearward directions when the shaft 57 is rotated accordingly.

The shaft 57 is designed as a control for the swing of the latch bar 35; and means are provided for locking the shaft at either end of the travel required to swing the latch bar the proper distance. The upper portion of the scoop has a frontal angle bar 60; and a pair of tapered tubes 62 of rectangular cross-section are lodged with their front ends in the angle bar 60 and pass with their rear end portions through the scoop wall 16, being welded at both ends to their supports. These tubes form the receptacles for the vehicle forks 12, receiving them with a slightly wedging fit.

One of the tubes 62 forms a support for a portion of the control mechanism now under consideration. Thus, it is seen that a bearing 65 is mounted on the tube referred to, such bearing journaling a rod 66. One end portion of the latter is formed with a rising bend 68 which continues with a lever 69 and terminates with an eye 70. At the other side of the bearings 65, the rod 66 is formed with an upward U-bend 72 defining a shaft 73 parallel to the rod 66. The shaft 73 journals a roller 75 and is reinforced by a link 76 extending from the rod 66.

The control shaft 57 carries a sturdy cam 80 formed with two falls 81 and 82, these being opposite the roller 75 of the rod 66. A spring 84 extends from the shaft 73 to the back of the channel bar 52 with the effect of drawing the roller 75 against the periphery of the cam 80. With the roller lodged in the fall 81, the shaft 57 is locked at one point of its rotary travel, while the location of the roller 75 in the fall 82 locks the shaft at the other end of its travel for the purposes previously referred to. Since it is expedient that the bottom 20 of the scoop be kept closed during normal conditions or travel, means are provided to urge the latch bar 35 to assume the full line position of Fig. 2, such means being a torsion spring 85 coiled on the shaft 57.

When the roller 75 is backed away from the cam 80, the shaft 57 is free to turn and therefore releases the latch bars for swinging to the position indicated by dotted lines in Fig. 2 in response to the weight of the scoop bottom 20 when the scoop carries a full or heavy load. However, when the load is light, the latch bars may be swung to disengage the scoop bottom by the action of the lever 69. Thus, a radial arm 87 is carried by the shaft 57 at a position alongside the bend 68, such arm presenting a side pin 88 to the rear of the said bend. Ordinarily, a cord 90 extended from a position handy to the driver of the vehicle connects with the lever eye 70 and may be drawn a short distance to back the roller 75 from the cam 80, in order to procure the dumping of a full or heavy load from the scoop as explained previously. However, where the load is light and its influence on the scoop bottom is not enough to push the latch bars back, then a further pull on the cord 90 will not only back the roller 75 farther away from the cam 80, but will also cause the bend 68 of the rod 69 to bear down on the side pin 88 of the radial arm 87 and rotate the shaft 57 with the effect of backing the latch bars and releasing the scoop bottom for free descent.

It is now apparent that the novel structure has a number of advantageous features. First, the scoop is engageable by the mere advance of the vehicle forks 12 when these are positioned at a suitable height to enter the tubes 62. The scoop thus becomes supported in front of the vehicle without the necessity of adjustments or the application of tools. The scoop may be chained or otherwise tied to one or both of the vehicle forks, but means for that purpose have no connection with the control mechanism under consideration, and are therefore omitted. Further, the scoop is provided with a bottom which is self-closing and locking when the scoop is lowered to the ground. Further, a latch bar mechanism is provided which is locked positively while the load is taken on or carried, but which may be positioned to unlock the scoop bottom supports by a short tug of a control cord leading from the vehicle. Further, a mechanism positively retracting the scoop bottom supports is operable by a further tug on the said cord. The mechanism thus is controlled by simple operations and without involved connections between the scoop and the vehicle. Finally, the parts entering into the control mechanism are of a sturdy character and relatively few.

While I have described the invention along specific lines, various minor changes or refinements may be made therein without departing from its principle, and I reserve the right to employ all such changes and refinements as may come within the scope and spirit of the appended claims.

I claim:

1. A frontal pick-up accessory for loading vehicles having a pair of forwardly projected lifting forks comprising a scoop, means carried by the latter for mounting it on the forks, a bottom for the scoop and hinged to the same at the rear, a pair of latch bars carried by the sides of the scoop and formed with hooks at their lower ends, retaining means carried by said bottom and engaged by said hooks to normally maintain the bottom in closed position, a control at the rear of the scoop effective to disengage the latch bars from said retaining means, whereby to permit said bottom to drop open, said control comprising a shaft journaled in supports carried by the rear of the scoop, lever means connecting the shaft with said latch bars to operate them relative to said retaining means, other means to lock the shaft from rotation initially in order to maintain said bottom in the closed position, a hand lever operable from the vehicle to retract said locking means in order to release said latch bars as stated, and further means actuated by said hand lever on the continued operation thereof to connect such lever means with the shaft to rotate the latter with the effect of withdrawing the latch bars from said retaining means.

2. A frontal pick-up accessory for loading vehicles having a pair of forwardly projected lifting forks comprising a scoop, means carried by the latter for mounting it on the forks, a bottom for the scoop and hinged to the same at the rear, a pair of latch bars carried by the sides of the scoop and formed with hooks at their lower ends, retaining means carried by said bottom and engaged by said hooks to normally maintain the bottom in closed position, a control at the rear of the scoop for said latch bars, such control comprising a shaft journaled in supports carried by the scoop, lever means directed from the shaft to said latch bars for operating the same when the shaft receives a partial turn, a member carried by the shaft and recessed at points defining the end of said partial turn, a stop element swingable to engage either of the member recesses when the shaft is positioned accordingly, a lever operable from said vehicle to retract said stop element from the member in order to release the same for free travel, and a crank carried by said shaft, such crank being in the path of said lever when its operation is continued to secure the rotation of the shaft.

References Cited in the file of this patent

UNITED STATES PATENTS

| | | |
|---|---|---|
| 2,319,456 | Hazen | May 18, 1943 |
| 2,458,949 | Lull | Jan. 11, 1949 |
| 2,460,764 | Oklejas | Feb. 1, 1949 |
| 2,482,692 | Quales et al. | Sept. 20, 1949 |
| 2,582,759 | Sass | Jan. 15, 1952 |
| 2,691,453 | Knoploh | Oct. 12, 1954 |

FOREIGN PATENTS

| | | |
|---|---|---|
| 137,952 | Australia | July 13, 1950 |